(12) United States Patent
Naganathan et al.

(10) Patent No.: US 6,594,108 B2
(45) Date of Patent: Jul. 15, 2003

(54) DISC DRIVE WITH CONVERGING FILTER INLET FOR FASTER CLEANUP TIMES

(75) Inventors: Girish Naganathan, Longmont, CO (US); Ernest Paul Lee, Boulder, CO (US); Loutfi Elias Charara, Thornton, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 56 days.

(21) Appl. No.: 09/896,318

(22) Filed: Jun. 29, 2001

(65) Prior Publication Data

US 2003/0002207 A1 Jan. 2, 2003

Related U.S. Application Data

(60) Provisional application No. 60/301,713, filed on Jun. 28, 2001.

(51) Int. Cl.[7] .............................................. G11B 33/14
(52) U.S. Cl. .................................................. 360/97.02
(58) Field of Search ........................... 360/97.02–97.04

(56) References Cited

U.S. PATENT DOCUMENTS

| | | | |
|---|---|---|---|
| 3,631,423 A | * | 12/1971 | Groom .................... 360/97.02 |
| 4,471,395 A | | 9/1984 | Beck et al. |
| 4,680,656 A | | 7/1987 | Manzke et al. |
| 4,888,655 A | | 12/1989 | Bonn |
| 5,025,337 A | | 6/1991 | Brooks |
| 5,034,835 A | | 7/1991 | Yokoyama |
| 5,101,305 A | | 3/1992 | Ohkita et al. |
| 5,179,483 A | | 1/1993 | Lowe |
| 5,307,222 A | | 4/1994 | Dion |
| 5,411,142 A | | 5/1995 | Abbott et al. |
| 5,491,596 A | | 2/1996 | Kobori |
| 5,517,372 A | | 5/1996 | Shibuya et al. |
| 5,907,453 A | | 5/1999 | Wood et al. |

* cited by examiner

Primary Examiner—A. J. Heinz
(74) Attorney, Agent, or Firm—Derek Berger

(57) ABSTRACT

An inlet to a disc drive's filter chamber is tapered to converge along most or all of its length so as to reduce drag and increase inflow volume and velocity. This accelerates the removal of particles from the disc drive's sealed chamber, reducing the likelihood of particle-induced data transfer errors or media damage.

16 Claims, 3 Drawing Sheets

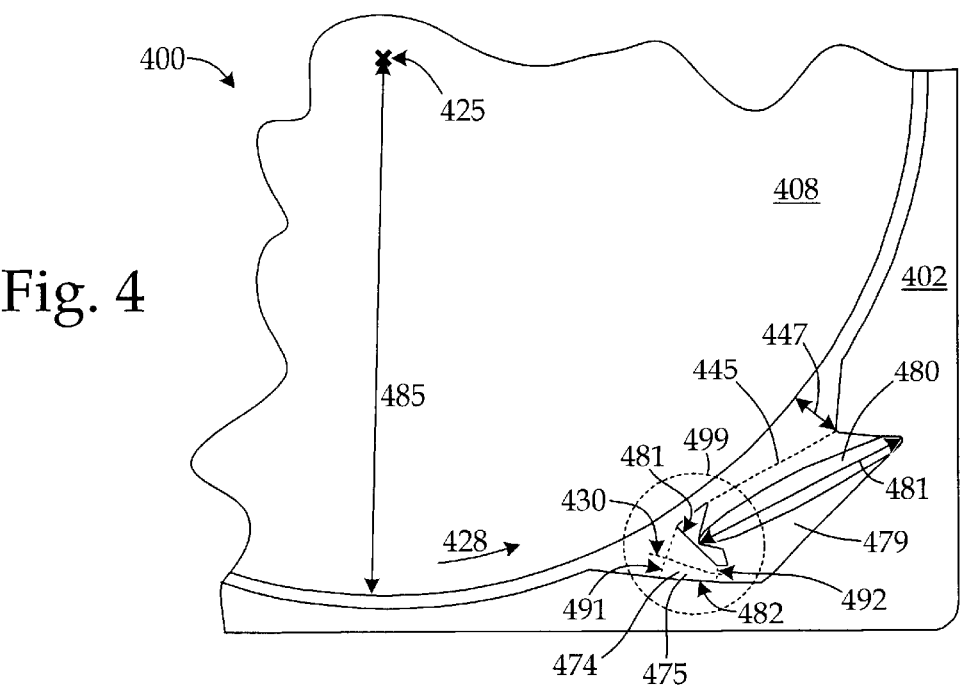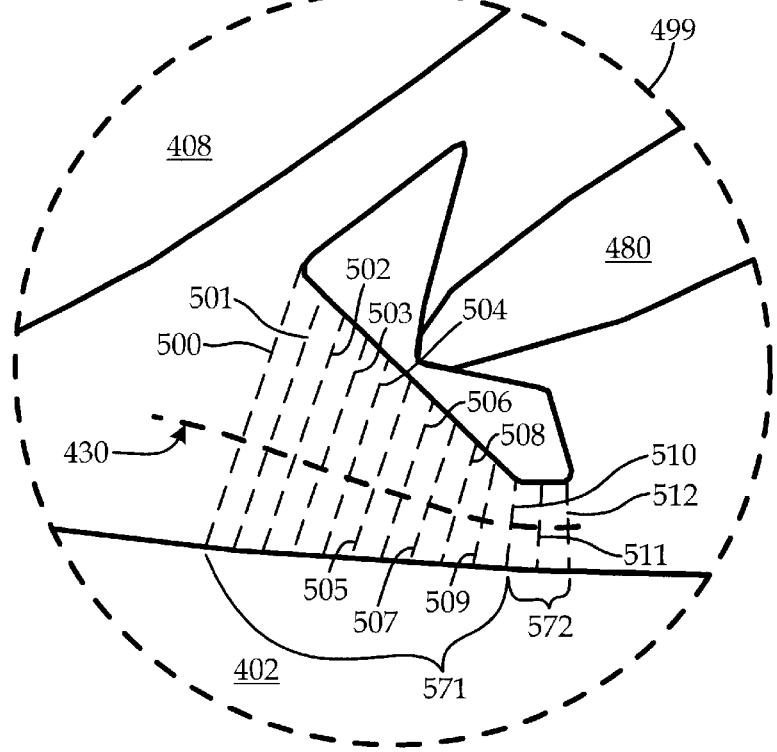

DISC DRIVE WITH CONVERGING FILTER INLET FOR FASTER CLEANUP TIMES

This application claims the benefit of provisional application No. 60/301,713, filed Jun. 28, 2001.

FIELD OF THE INVENTION

This application relates generally to removing stray particles from a disc drive and more particularly to controlling a flow through a particle filter so as to remove particles more quickly.

BACKGROUND OF THE INVENTION

Disc drive machines record and reproduce information on a recording media. The media generally takes the form of circular information storage discs having a multiplicity of concentric tracks. Conventional hard disc drives include a disc pack holding a plurality of vertically aligned rotating information storage discs, each surface of which has an associated magnetic head that is adapted to transfer information between the disc and an external system. An elongated flexure arm supports each head so that the head flies a small distance from its respective data storage surface. The rotation of the discs creates an air bearing that controls fly height.

It is extremely important to the operation of the disc drive to quickly establish and maintain a dust free environment within the drive. Fly heights are very small, typically 0.5 microinches or less. A disc drive typically contains many particles much larger than this, at least initially. These particles can cause read or write errors, and can even damage the data surfaces or the heads.

To prevent dust particles from entering into the drive it is important to thoroughly filter any air that enters the drive from the outside. Drives are typically vented to the outside only through a breather filter that very efficiently filters dust particles from any air passing therethrough.

It is also important to limit the number of particles generated inside the drive. Unfortunately, some of the actions that generate particles are unavoidable. At present, the principal source of dust within the drive is microparticles that flake off of the parking surfaces when the drive is started and stopped. Other parts that rub during operation can cause dust particles as well. Therefore, it is necessary to provide effective internal particle filtering.

For improved performance, Seagate engineers have been working to reduce "cleanup time," the time needed for a particle filter to remove substantially all of the dust particles suspended in the air inside a disc drive. Until recently, most of this effort has been confined to improving the quality of particle filters, not appreciating the importance of optimizing air flow through them. It is to this shortcoming that the present invention is directed.

SUMMARY OF THE INVENTION

As with a conventional disc drive, the present invention includes an aperture for receiving gas flow from a rotatable disc stack within a sealed housing. To accelerate the filtering of particles, a disc drive of the present invention includes a means for receiving an initial flow and for providing to the chamber a modified flow at a higher flow rate.

In a typical embodiment, this is accomplished by a tapered channel having inner and outer opposing walls. For specificity, many features of the channel are defined with respect to a fastest-flow path passing between these walls, with the disc drive operating under nominal conditions. The path extends beyond an inlet and an outlet of the channel, both of which are defined as closed planar cross sections having a solid circumference. The inlet is defined as an upstream-most closed planar cross section orthogonal to the path. The outlet is similarly defined as a downstream-most smallest-area planar cross section orthogonal to the path. The channel contains exactly one cross-section orthogonal to the path for each corresponding point on the path.

Preferably, at least ⅔ of the length of the channel is substantially converging (i.e. having a cross sectional area that decreases at least 0.1% for each advance of R/100, where R is the nominal disc radius). Next, a shorter "conduit" that is substantially uniform passes the flow into the chamber. As a result of these features, under normal operating conditions, the average pressure in the filter chamber is significantly higher than that of the entire sealed chamber, significantly reducing the disc drive's cleanup time.

Additional features and benefits will become apparent upon a review of the following drawings and the corresponding detailed description.

BRIEF DESCRIPTION OF THE DRAWINGS

FIG. 4 shows a top view of a portion of a disc drive of the present invention.

FIG. 5 shows a greatly magnified view of a circular portion of FIG. 4.

DETAILED DESCRIPTION

Figure 1:
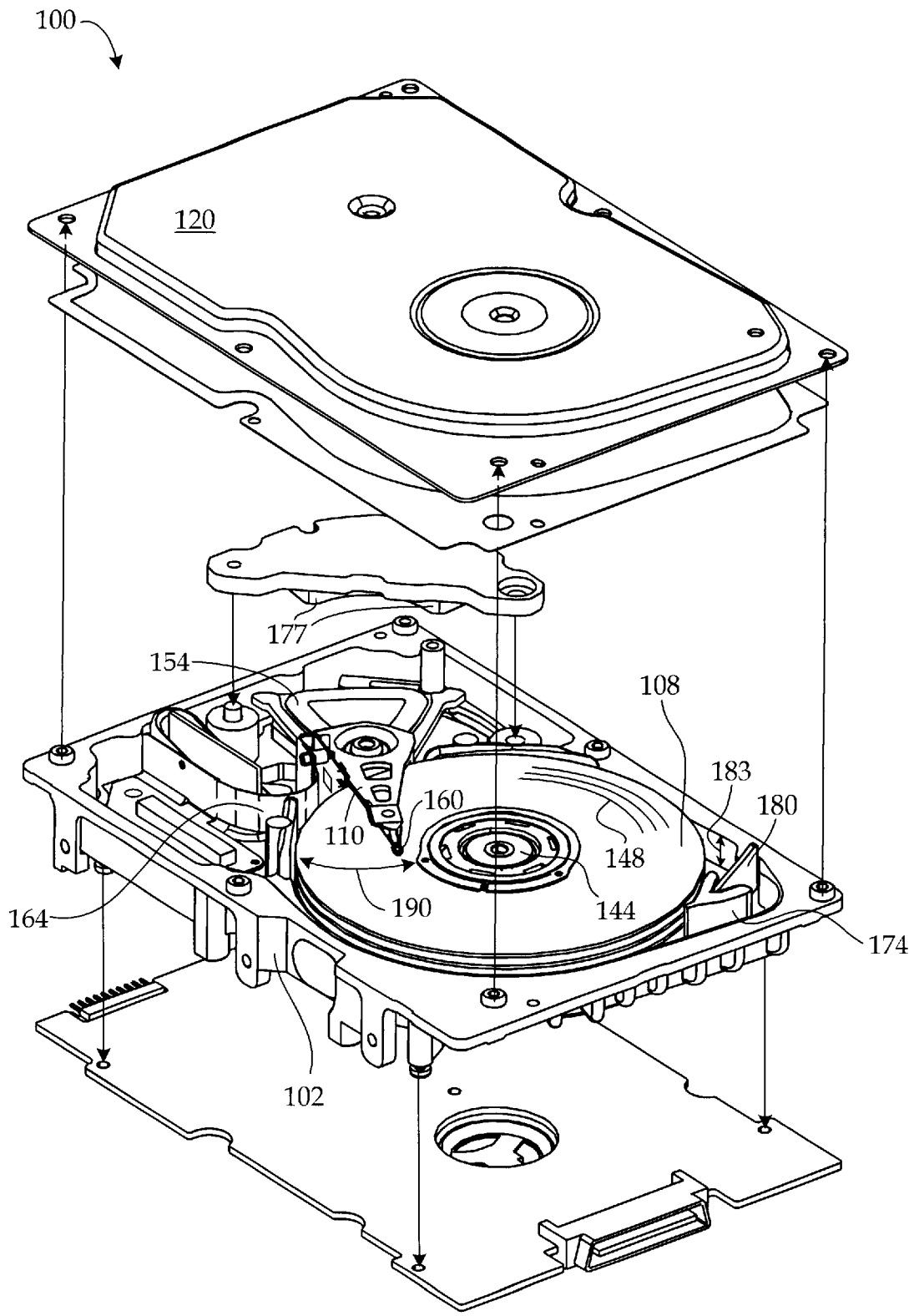
FIG. 1 shows a partially exploded, oblique view of a disc drive of the present invention.

Referring to the drawings in general, and more particularly to FIG. 1, shown there is a disc drive 100 configured to implement the present invention. Disc drive 100 includes a housing 102 containing several discs 108 in a stack arranged for co-rotation in a conventional manner. Preferably, the discs 108 are each at least 50 mils thick to minimize the flutter that can result from having gaps in the shroud circumscribing the disc stack. The cover 120 is configured to engage with the housing to provide a conventional sealed chamber. The chamber is sealed to resist the introduction of contaminants. The top and bottom flat surfaces of each disc 108 each include many thousands of circular tracks 148 containing data. A rotary actuator 110 supports several transducer heads 160 each supported on a respective arm adjacent a respective surface of a disc 108. A conventional voice coil motor (comprising at least one magnet 177 and at least one voice coil 154) controls the position of the actuator 110 so that a selected one of the heads 160 is positioned on its arc 190 adjacent a selected track 148. Once the head 160 is following the selected track 148, data can be retrieved from or written to the track 148 via a flex connector 164 through which data signals flow.

A spindle motor 144 causes the discs 108 to spin, counterclockwise as shown, at a tightly-controlled nominal frequency of several thousand revolutions per minute. This causes a wind of hundreds of feet per second to be carried along all about the circumference of discs. At the same time, head 160 flies a very small distance (less than 1 microinch) above its respective disc 108. This fly height must be small enough for strong magnetic interactions, but large enough to prevent damaging collisions. As it turns out, this distance is small enough that dust particles play a very significant role.

To reduce the number of dust particles, a particle filter 180 is positioned to permit air to flow through it whenever the disc stack spins. According to the present invention, a tapered inlet is provided to increase the amount of air that will enter the filter chamber, which in turn increases the amount of air that flows through the chamber. The height 183 of the sealed chamber is also shown. For present purposes, it can be assumed that all open portions of the sealed chamber of all disc drives have this uniform height. Lengths and widths of items shown are therefore also representative of vertical cross-sectional areas. This is especially significant in the description of FIG. 6 below.

Figure 2:
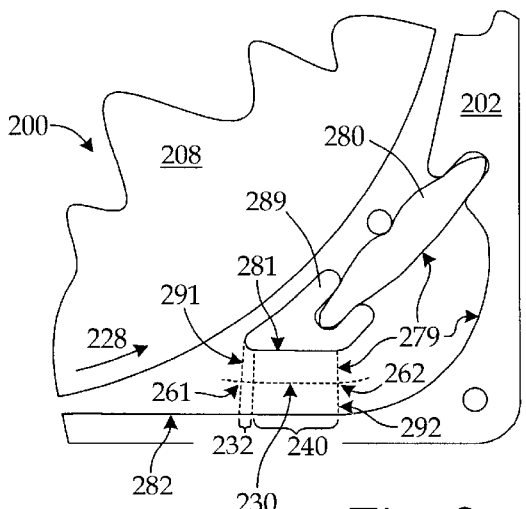
FIG. 2 shows a top view of a disc drive with a filter/chamber/inlet configuration of the prior art.

FIG. 2 shows a top view of a disc drive 200 with a filter/chamber/inlet configuration of the prior art, drawn to scale. Particle-capturing filter 280 is supported between opposing C-shaped gaps on the housing 202. One of the C-shaped gaps is on a column 289 of the housing that extends to contact the cover (not shown) of the disc drive 200. The corner of the disc drive 200 shown is essentially uniform throughout the height of the chamber 279 and channel. For present purposes the dimensions are height-normalized so that the widths as shown in FIG. 2 directly represent the cross-sections of each depicted item.

As discs 208 spin in direction 228, air enters the filter chamber 279 through a channel having a substantially converging portion 232 and a substantially uniform portion 240. Filter 280 forms one side of chamber 279, so that all air flowing into chamber 279 flows out through filter 279. The channel has an inlet 291 and an outlet 292 that are both planar and substantially vertical. For specificity, the inlet 291 is defined so that its point 261 of fastest flow has a flow direction that is perpendicular to the inlet 291, and that the inlet is the leftmost (upstream-most) cross section having a closed boundary. The outlet 292 is similarly defined so that its point 262 of fastest flow has a flow direction that is perpendicular to the outlet 292. Connecting the points 261, 262 of fastest flow is a path 230 of fastest flow. Each point on path 230 downstream from inlet 261 has a corresponding cross-section of the channel which has a corresponding area. Outlet 292 is further defined so that the area is equal to the minimum of these areas.

Note that the boundary of the inlet 291 intersects inner and outer walls 281,282 that extend along the channel. Note also that "substantially uniform" portion 240 is so named because its cross-sectional area (perpendicular to path 230) varies by less than 0.1%, as measured by planes at any two points separated along the path 230 by exactly R/1000, R being the nominal radius of the discs 208. As used herein, similarly, a "substantially" converging or diverging portion such as 232 is one having a cross section that decreases too significantly, over too long a downstream or upstream path, to qualify as "substantially uniform."

Figure 3:
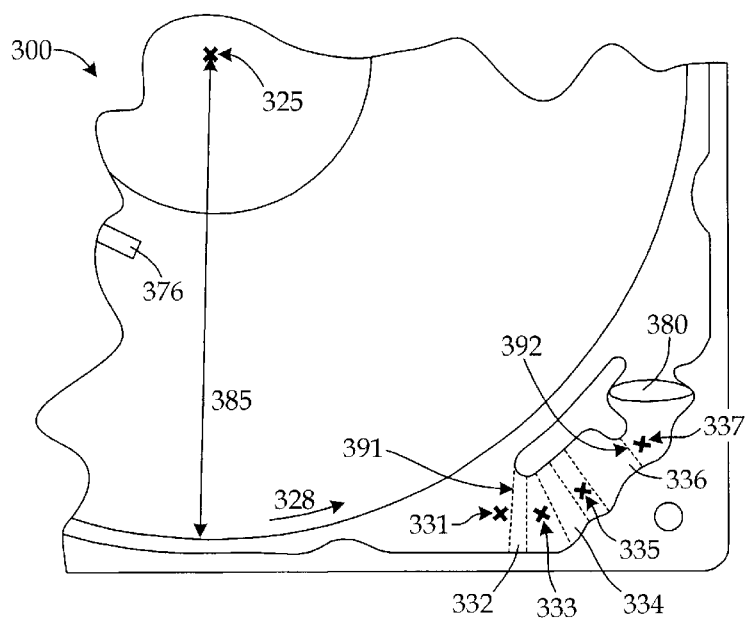
FIG. 3 shows another configuration of the prior art.

FIG. 3 shows a portion of another disc drive 300 of the prior art, including a particle-capturing filter 380. Discs 308 having a nominal radius 385 rotate counterclockwise 328 about axis 325, permitting heads 376 to fly adjacent corresponding surfaces of discs 308. (In the disc drive arts, note that the "vertical" direction is conventionally defined by the axis 325 of the disc stack, not by the planet's center). A series of time-averaged maximum flow points 331,333,335, 337 is shown. Note that the channel is bounded by an inlet 391 and an outlet 392, and that points 333 and 335 are within substantially divergent parts of the channel. Interleaved therewith are three substantially convergent parts 332,334, 336 of the channel. As with FIG. 2, FIG. 3 is drawn to scale. Vertical surfaces shown therein are essentially uniform and essentially extend between a flat floor and a flat ceiling. A close examination of FIG. 3 will thus reveal that along an estimated fastest-flow path connecting the reference points 331,333,335,337, less than ⅔ of the length of the channel is within a substantially converging portion.

As used here and consistent with industry usage, "substantially convergent" refers to a portion of a channel or conduit having a cross section that decreases at least 0.1% for each advance of R/100 along the fastest-flow path, where R is the nominal radius of a disc in the stack. A conduit is "substantially uniform" if it is neither substantially convergent nor substantially divergent. Note that a conduit may thus be "substantially uniform" even if it is textured.

Concerning FIGS. 2 & 3, note that the described features concerning the maximum flow path, perpendicular cross sections, and convergent portions of channels are not conventionally referenced or known in the art. Rather, the drives 200,300 themselves are in public use. The features described above are inherent in these prior art designs, however, these inherent features are useful in contrasting designs of the present invention.

FIG. 4 shows a portion of a disc drive 400 of the present invention. Disc drive 400 includes a sealed housing 402 containing air. A stack of one or more discs 408 having a nominal radius 485 rotate counterclockwise 428 at a nominal frequency about axis 425 using means like those of FIG. 1. As a result, air flows into a flow-directing channel 474 having inner and outer opposing walls 481,482 and a curvilinear fastest-flow path 430 passing therebetween. The channel 474 is bounded by an inlet 491, an outlet 492, vertical walls 481 and 482, and a horizontal ceiling and floor. Inlet 491 is defined as the upstream-most closed cross section orthogonal to path 430. Outlet 492 is defined as the downstream-most smallest-area cross section orthogonal to path 430.

Channel 474 contains exactly one cross-section orthogonal to the path for each corresponding point on the path, the channel having a length along the path bounded by inlet 491 and outlet 492. Unlike any conventional disc drives, at least ⅔ of the length is within a substantially convergent portion 475 of the channel 474. (Note that the convergent portion 475 is 100% of the channel, in the example of FIG. 4).

Because of this convergence, chamber 479 receives more air from channel 474 than a similarly constructed design of the prior art. The volume-averaged air pressure in chamber 479 is at least 5% to 50% higher than the volume-averaged air pressure within the entire disc drive cavity within housing 402. (All gas pressures mentioned in this document are absolute pressures, not gauge pressures.)

In the preferred embodiment as shown, to scale, particle-capturing filter 480 has a width 481 at least 20% to 50% of the nominal radius 485 (R). Additionally, the gap between the downstream side of the filter 480 and the discs 408 has a smallest-area cross-section 445 that is entirely within a horizontal distance 447 of the discs 408 that is less than 5% to 50% of R. Because the cross-section 445 has a width greater than 10% to 50% of R, also, the "fastest flow" path of the filter outlet gap has no special importance.

Turning now to FIG. 5, there is shown a greatly magnified view of a circular portion 499 of FIG. 4. The widths of several cross sections 500,501,502,503,504,505,506,507, 508,509,510,511,512 are shown, all in planes perpendicular to fastest-flow path 430. The leftmost cross section 500 is constructed as far to the left as possible, in FIG. 5, while being closed by inner wall 481. Cross section 500 thus is identical to inlet 491. Each cross section is separated from its successor along path 430 by exactly R/100.

A single-disc implementation of the embodiment of FIGS. 4&5, Seagate's "Snowmass" product, has an actual nominal rotation rate of 7200 rotations per minute. By replacing a prior design with a tapered inlet design substantially as shown, the cleanup time was reduced by more than 20%. More particularly, the operating time until substantially all of the particles in the size range of 0.09 to 0.20 microns were eliminated was reduced from 23 seconds to 18 seconds. For modern disc drives with heads that fly about 0.5 microinches or less above the disc, this is a meaningful risk reduction.

Figure 6:
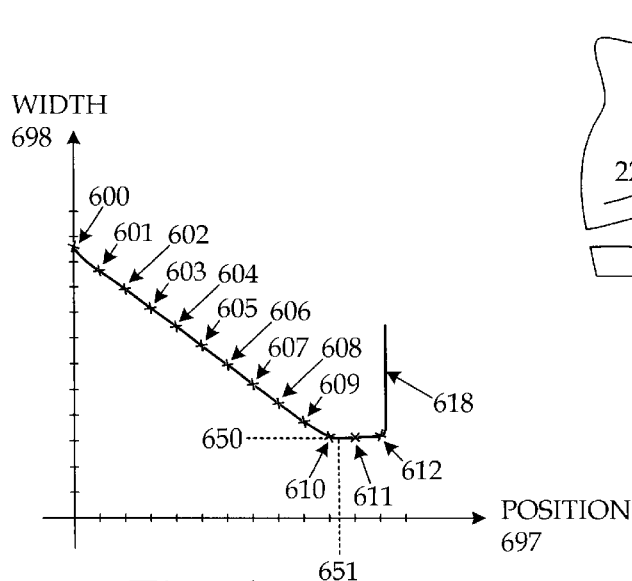
FIG. 6 shows a plot of cross-sectional areas versus position, for the channel and conduit shown in FIGS. 4&5.

FIG. 6 shows a plot of widths 698 versus position 697, both tick-marked in accurate increments of R/100. Width points 600,601,602,603,604,605,606,607,608,609,610,611, 612 correspond to each respective cross section 500,501, 502,503,504,505,506,507,508,509,510,511,512 of FIG. 5. Cross sectional area 618 is also plotted vertically, in areal units scaled so that each cross section has a width and area point exactly overlaid. Note that this assumes a constant channel and chamber height, which is graphically helpful but not fundamental to the present invention.

Note that at the inlet (where position=0), width has its maximum finite value. To the left of the inlet 491, width is infinite. Moving downstream, cross sectional area 618 decreases steadily to a minimum value 650, defining the channel outlet 492 at position 651. A small distance to the right of cross section 512, cross sectional area 618 jumps to a very large value.

Alternatively characterized, a first embodiment of the present invention is a disc drive (such as 100) that includes a sealed housing (such as 102), a rotatable stack of discs (such as 108), and a chamber adjacent a particle filter (such as 180). The chamber is configured to receive a gas flow through a channel (such as 174,474) that converges along most or all of its length. The chamber has a volume-averaged gas pressure last least 5% larger than that of the sealed housing. In this preferred embodiment, the chamber has a larger volume than that of the channel, and the filter is wider than R/10, where R is the nominal radius of a disc (such as 408) in the stack.

In a second embodiment, the channel has inner and outer opposing walls (such as 481,482) and a curvilinear fastest-flow path (such as 430) passing between them. The path extends beyond an inlet and an outlet of the channel. For specificity, the inlet (such as 491) is defined as an upstream-most closed planar cross section orthogonal to the path. The outlet (such as 492) is similarly defined as a downstream-most smallest-area planar cross section orthogonal to the path. The channel contains exactly one cross-section orthogonal to the path for each corresponding point on the path. The channel has a length along the path bounded by the inlet and the outlet. The length is between 5% and 20% of R.

In a third embodiment, the inlet (such as 491) is a planar cross section configured to receive from the disc stack an initial flow characterized by V1, where V1 is a volume flow rate across the cross section. The initial flow is received into a means (such as channel 474) for receiving the initial flow and for providing to a filter chamber (such as 479) a modified flow characterized by V2>V1, where is a volume flow rate of the modified flow.

In a fourth embodiment, a continuously converging portion (such as 571) of the channel contains at least ⅔ of the channel's length (i.e. along the fastest-flow path). The portion contains a series of several cross sectional areas (such as 500 through 510) each orthogonal to the path and defining successive pairs of the areas. Each of the successive pairs is separated by a distance along the path of R/100. Each of the successive pairs consists of a downstream one $A_{i+1}$ and an upstream one $A_i$. The portion converges steadily enough so that $0.80<(A_{i+1}/A_i)<0.99$ for each of the successive pairs.

In a fifth embodiment, the narrowest portion of the channel/filter combination occurs at one nominally uniform, contiguous conduit that overlaps the channel and the chamber. The conduit has a nominal cross section and two ends, the ends each abutting a respective region having a larger-than-nominal cross section. To promote laminar flow while minimizing drag, the conduit having a length between 1% and 5% of R.

In a sixth embodiment, reference is made to the volume-averaged, time-averaged flow speed that is an inherent attribute of the chamber and of the channel. In this preferred embodiment, this flow speed is greater for the channel than for the chamber. As a result of this flow speed increase, the stagnation pressure within the filter chamber increases non-linearly.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the various embodiments of the present invention have been described with respect to a disc drive, the present invention is also applicable to, and may be implemented in, other data storage devices such as optical disc drives and magneto-optical disc drives. Numerous other changes may be made which will readily suggest themselves to those skilled in the art and which are encompassed in the spirit of the invention disclosed and as defined in the appended claims.

What is claimed is:

1. A disc drive comprising:
   a sealed housing containing a gas having a volume-averaged gas pressure P;
   a rotatable disc stack within the housing, comprising a data storage disc having a radius R;
   a flow-directing channel having inner and outer opposing walls and a curvilinear fastest-flow path passing therebetween, the channel having an inlet and an outlet, the path extending beyond the inlet and beyond the outlet, the inlet being defined as an upstream-most closed planar cross section orthogonal to the path, the outlet being defined as a downstream-most smallest-area planar cross section orthogonal to the path, the channel containing exactly one cross-section orthogonal to the path for each corresponding point on the path, the channel having a length along the path bounded by the inlet and the outlet, at least ⅔ of the length being within a substantially convergent portion of the channel; and
   a chamber receiving gas from the channel, the chamber having a volume-averaged gas pressure larger than 1.05 P, the chamber bounded by the channel outlet and by a particle-capturing filter.

2. The disc drive of claim 1 in which the substantially convergent portion of the channel is contiguous.

3. The disc drive of claim 1 in which the length is at least R/20.

4. The disc drive of claim 1 in which the length is at most R/5.

5. The disc drive of claim 1 in which one substantially uniform, contiguous conduit overlaps the channel and the chamber, the conduit having a nominal cross section and two ends, the ends each abutting a respective region having a larger-than-nominal cross section, the conduit being longer than R/100.

6. The disc drive of claim 5 in which the conduit is shorter than R/20.

7. The disc drive of claim 1 in which at least 95% of the length of the channel is within a substantially convergent portion of the channel.

8. The disc drive of claim 1 in which the substantially convergent portion of the channel contains a series of several cross sectional areas $A_0, A_1, \ldots, A_N$ each orthogonal to the path and defining N−1 successive pairs of the areas, in which each of the successive pairs consists of a downstream one $A_{i+1}$ and an upstream one $A_i$ such that $(A_{i+1}/A_i)<0.998$, and in which each successive pair is separated by a distance along the path of R/100.

9. The disc drive of claim 8 in which the portion converges steadily enough so that $0.80<(A_{i+1}/A_i)<0.99$ for each of the successive pairs.

10. The disc drive of claim 1 in which the filter has a width greater than R/10.

11. The disc drive of claim 1 in which the chamber and the channel each have a volume, the chamber volume being higher than the channel volume.

12. The disc drive of claim 1 in which the channel's volume-averaged, time-averaged flow speed is greater than the chamber's volume-averaged, time-averaged flow speed.

13. The disc drive of claim 1 in which the filter has an outlet passage having an average height H, the outlet passage having a minimum cross-sectional area greater than RH/10.

14. A disc drive comprising:
a sealed housing containing a gas having a volume-averaged gas pressure P;
a rotatable disc stack within the housing, comprising a data storage disc having a radius R;
a flow-directing channel having inner and outer opposing walls and a curvilinear fastest-flow path passing therebetween, the channel having an inlet and an outlet, the path extending beyond the inlet and beyond the outlet, the inlet being defined as an upstream-most closed planar cross section orthogonal to the path, the outlet being defined as a downstream-most smallest-area planar cross section orthogonal to the path, the channel containing exactly one cross-section orthogonal to the path for each corresponding point on the path, the channel having a length along the path bounded by the inlet and the outlet, the length being between 5% and 20% of R;

a contiguous portion of the channel containing at least ⅔ of the length, the portion containing a series of several cross sectional areas $A_0, A_1, \ldots, A_N$ each orthogonal to the path and defining N−1 successive pairs of the areas, in which each of the successive pairs is separated by a distance along the path of R/100, in which each of the successive pairs consists of a downstream one $A_{i+1}$ and an upstream one $A_i$, and in which the portion converges steadily enough so that $0.80<(A_{i+1}/A_i)<0.99$ for each of the successive pairs.

a chamber receiving gas from the channel, the chamber having a volume-averaged gas pressure larger than 1.05 P, the chamber bounded by the channel outlet and by a particle-capturing filter wider than R/10, the chamber also having a volume greater than a volume of the channel; and one nominally uniform, contiguous conduit overlapping the channel and the chamber, the conduit having a nominal cross section and two ends, the ends each abutting a respective region having a larger-than-nominal cross section, the conduit being between 1% and 5% of R.

15. A disc drive comprising:
a sealed housing containing a gas having a volume-averaged gas pressure P;
a rotatable disc stack within the housing, comprising a data storage disc;
a chamber having a volume-averaged gas pressure larger than P, the chamber bounded by a particle-capturing filter;
an aperture having a planar cross section configured to receive from the disc stack an initial flow characterized by V1, where V1 is a volume flow rate across the cross section upstream from the chamber; and
means for receiving the initial flow and for providing to the chamber a modified flow characterized by V2>V1, where V2 is a volume flow rate of the modified flow.

16. The disc drive of claim 15 in which the means comprises a channel having a length and a convergent portion extending along at least ⅔ of the length.

* * * * *